US012642158B2

(12) United States Patent
Buse et al.

(10) Patent No.: US 12,642,158 B2
(45) Date of Patent: Jun. 2, 2026

(54) METHOD, APPARATUS AND SYSTEM FOR DETECTING AN AGRICULTURAL VEHICLE PATH

(71) Applicant: DEERE & COMPANY, Moline, IL (US)

(72) Inventors: Scott M. Buse, Adel, IA (US); Akshay Kumar, Rhineland Palatinate (DE); Paul Parage, Strasbourg (FR); Philipp Feldmann, Rhineland Palatinate (DE); Martin Seimetz, Heusweiler (DE); Kilian Wolff, Mandelbachtal (DE)

(73) Assignee: DEERE & COMPANY, Moline, IL (US)

( * ) Notice: Subject to any disclaimer, the term of this patent is extended or adjusted under 35 U.S.C. 154(b) by 23 days.

(21) Appl. No.: 18/788,374

(22) Filed: Jul. 30, 2024

(65) Prior Publication Data

US 2025/0040464 A1     Feb. 6, 2025

(30) Foreign Application Priority Data

Aug. 1, 2023    (DE) .......................... 102023120383.5

(51) Int. Cl.
*A01B 69/04*          (2006.01)
*A01B 69/00*          (2006.01)

(52) U.S. Cl.
CPC .......... *A01B 69/008* (2013.01); *A01B 69/001* (2013.01)

(58) Field of Classification Search
CPC ........................... A01B 69/001; A01B 69/008; G01C 21/1656; G06V 20/188; G06V 20/56
See application file for complete search history.

(56) References Cited

U.S. PATENT DOCUMENTS

| | | | |
|---|---|---|---|
| 6,445,983 B1 | 9/2002 | Dickson et al. | |
| 2009/0204281 A1 | 8/2009 | Mcclure et al. | |
| 2012/0226548 A1* | 9/2012 | Hanna .................... | G06Q 30/02 705/14.43 |
| 2017/0006759 A1* | 1/2017 | Adamchuk .............. | B62D 1/00 |
| 2018/0325012 A1* | 11/2018 | Ferrari ................. | A01B 69/001 |

(Continued)

FOREIGN PATENT DOCUMENTS

| | | |
|---|---|---|
| DE | 102016209437 A1 | 11/2017 |
| DE | 102017217391 A1 | 4/2019 |

(Continued)

OTHER PUBLICATIONS

Xiaojun Wan et al., Automatic Navigation System with Multiple Sensors, Computer and Computing Technologies in Agriculture, vol. II. CCTA 2007, The International Federation for Information Processing, vol. 259. Springer, Boston, MA, pp. 777-784.

(Continued)

*Primary Examiner* — Calvin Cheung

(57)          ABSTRACT

A system for detecting a path of an agricultural vehicle in a field comprising: a ground engaging member supporting the agricultural vehicle; and an image sensor system associated with the agricultural vehicle, the image sensor system configured with a field of view including the ground engaging member and a plant row in the field adjacent to the ground engaging member and detecting a deviation from a target path of the agricultural vehicle wherein the ground engaging members contact the plant row.

16 Claims, 4 Drawing Sheets

(56)                References Cited

U.S. PATENT DOCUMENTS

| | | | |
|---|---|---|---|
| 2018/0373259 A1* | 12/2018 | Aberle | B62D 1/28 |
| 2019/0195824 A1 | 6/2019 | Speck | |
| 2022/0377962 A1* | 12/2022 | Susko | G05D 1/0246 |
| 2023/0060628 A1 | 3/2023 | Schleicher et al. | |
| 2023/0229163 A1 | 7/2023 | Rust et al. | |
| 2024/0428583 A1* | 12/2024 | Arakawa | G06V 10/764 |

FOREIGN PATENT DOCUMENTS

| | | |
|---|---|---|
| DE | 102019203651 A1 | 9/2020 |
| DE | 102019207984 A1 | 12/2020 |
| DE | 102023119302 A1 | 1/2025 |
| EP | 1266553 A2 | 12/2002 |
| EP | 1321037 A2 | 6/2003 |
| EP | 2545761 A1 | 1/2013 |
| EP | 2954772 A1 | 12/2015 |
| EP | 3146825 A1 | 3/2017 |
| EP | 4140238 A1 | 3/2023 |
| WO | WO 2008150418 A1 | 12/2008 |
| WO | WO 2014105928 A1 | 7/2014 |
| WO | WO 2018067473 A1 | 4/2018 |

OTHER PUBLICATIONS

DAMMANN-trac DT 2800 H S5 ecodrive, Druckvermerk Nov. 2019 DE, pp. 1-21.

F. Rovira-Más et al., Kalman filter for sensor fusion of GPS and Machine Vision, The 2006 ASABE Annual International Meeting, St. Joseph, Michigan, USA, Jul. 9-12, pp. 1-15.

Extended European Search Report and Written Opinion issued in European Patent Application No. 24185178.1 dated Dec. 18, 2024, in 12 pages.

* cited by examiner

METHOD, APPARATUS AND SYSTEM FOR DETECTING AN AGRICULTURAL VEHICLE PATH

RELATED APPLICATIONS

This document claims priority based on German Patent Application No. 102023120383.5, filed on Aug. 1, 2023, which is hereby incorporated by reference into this application.

DESCRIPTION

The present disclosure relates to a method, system and apparatus for detecting a possible deviation of an agricultural vehicle from a target path when working on plants grown in rows.

BRIEF DESCRIPTION

A system for detecting a path of an agricultural vehicle in a field comprising: a ground engaging member supporting the agricultural vehicle; and an image sensor system associated with the agricultural vehicle, the image sensor system configured with a field of view including the ground engaging member and a plant row in the field adjacent to the ground engaging member and detecting a deviation from a target path of the agricultural vehicle wherein the ground engaging members contact the plant row.

A method for detecting a path of an agricultural vehicle in a field comprising: providing an image sensor system associated with the agricultural vehicle; viewing, simultaneously, a ground engaging member of the agricultural vehicle and a plant row in the field adjacent to the ground engaging member; and detecting, using the image sensor system, contact with a plant in the plant row by the ground engaging members indicating a deviation of the agricultural vehicle from a target path when performing an operation in the field.

An apparatus for detecting a path of an agricultural vehicle comprising: an image sensor associated with the agricultural vehicle, the image sensor configured with a field of view a ground engaging member supporting the agricultural vehicle and a plant row in the field adjacent to the ground engaging member; and a controller associated with the agricultural vehicle, the controller configured to receive an output signal of the image sensor, determine whether the ground engaging members contacted the plant row and adjust the path of the agricultural to prevent contact with the plant row.

BRIEF DESCRIPTION OF DRAWINGS

The above-mentioned aspects of the present disclosure and the manner of obtaining them will become more apparent and the disclosure itself will be better understood by reference to the following description of the examples of the disclosure, taken in conjunction with the accompanying drawing, wherein.

DETAILED DESCRIPTION

Figure 1:
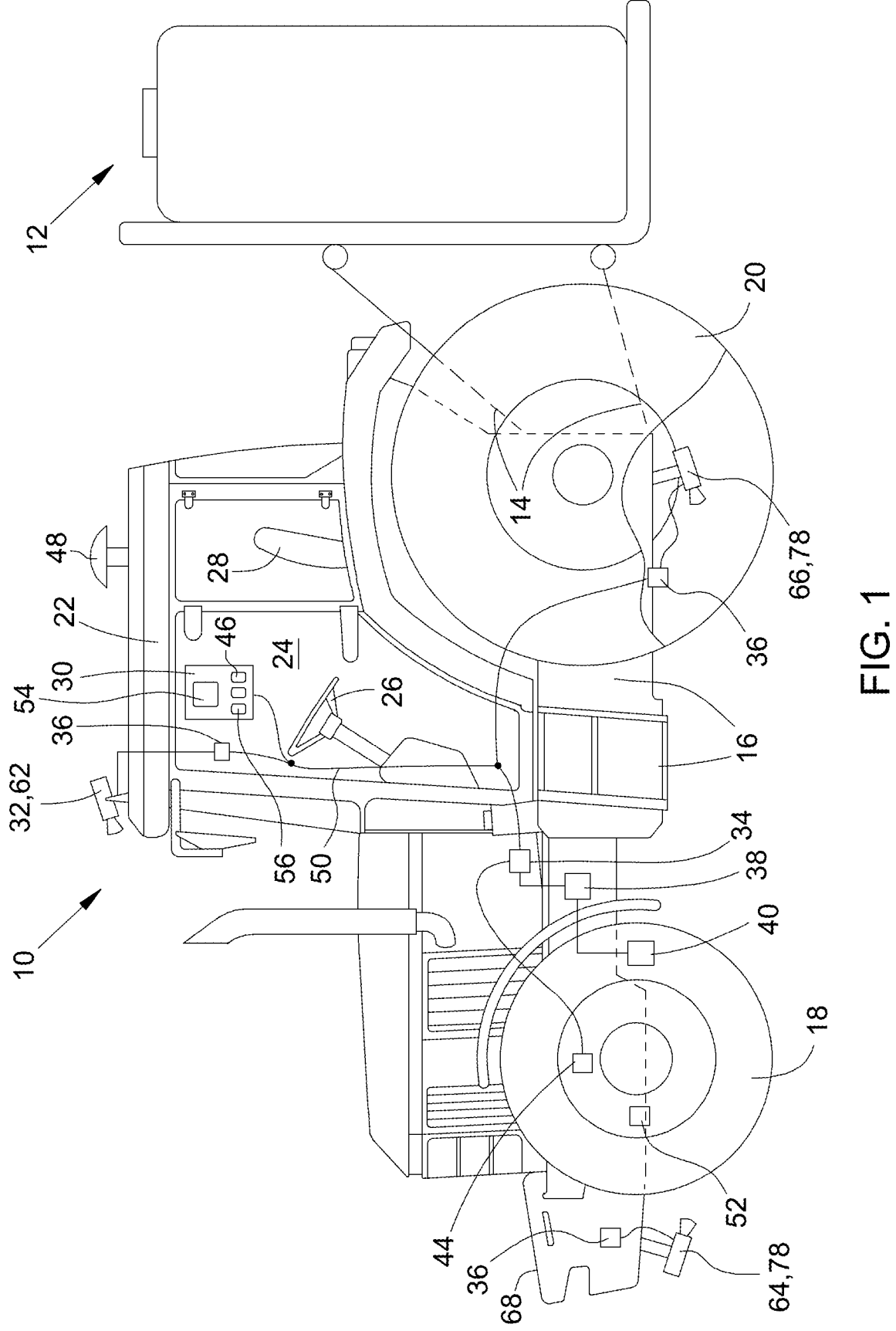
FIG. 1 shows a lateral view of an agricultural vehicle with an arrangement for the automatic guidance of the vehicle over a field.

In the case of certain agricultural operations, vehicles must be driven along defined paths in a field, for example when hoeing to remove unwanted weeds growing between rows of plants, or when spraying when a sprayer is to be moved across a field on a tramline or between rows of plants. In some examples, automatic steering systems provide a steering signal on the basis of pre-stored paths and a current position and orientation of the vehicle and a target lane recorded by a navigation system and/or on the basis of an optical detection of the field in front of the vehicle in order to facilitate the work of the operator of the vehicle (e.g., U.S. Pat. No. 6,445,983 B1; European Patent No. EP 1 266 553 A2; WIPO Patent No. WO 2008/150418 A1; WIPO Patent No. WO 2018/067473 A1; Wan, X., Liu, G. (2008). Automatic Navigation System with Multiple Sensors. In: Li, D. (eds) Computer and Computing Technologies in Agriculture, Volume II. CCTA 2007. The International Federation for Information Processing, vol 259. Springer, Boston, Ma.). These optical sensors look forward from the vehicle to detect the field to be processed, even if they can be mounted on the underside of the vehicle, e.g., on the front axle (US Patent Publ. No. 2019/0195824 A1). The WIPO Patent No. WO 2014/105928 A1 describes a steering system with a downward-looking camera mounted below the vehicle, which recognizes certain features and their different positions in successive images and can thus determine the movement of the vehicle to generate a steering signal.

In other examples the ground at the rear of a harvesting attachment is recorded by a camera during a harvesting process to detect possible ground contact of the harvesting attachment or stationary crop and, if necessary, to be able to correct settings of the harvesting attachment (European Patent No. EP 2 545 761 A1; German Patent No. DE 10 2019 207 984 A1; and European Patent No. EP 4 140 238 A1). A tramline camera on a self-propelled sprayer, which allows a view of the wheel and the tramline from a position above the wheel and thus subject to ambient light disturbance (e.g., DAMMANN-trac DT 2800 H S5 ecodrive, print note Nov2019 DE).

The steering systems based on optical sensors and/or navigation systems for guiding agricultural vehicles along tramlines or rows of plants are not able to detect whether the vehicle is really being steered along the desired lane or not, because any errors caused by the sensors themselves (e.g. errors of the optical sensors in the detection of features in the field or incorrect vehicle position or orientation detection for steering or when previously creating the target lane) or in the control loop (external influences, such as slope inclination or slippage of a ground engaging member) and lead to plants or rows being unintentionally contacted (e.g., run over), are not detected. The above-mentioned camera systems, which are used to control the operation of the harvesting attachments, monitor at most the ground after it has been passed by the harvesting attachment and, even if they were attached to a vehicle to be steered along rows, would not be able to detect whether or what caused any damage to the plant. It would therefore be desirable to provide the operator of an agricultural vehicle and/or a steering system of the vehicle with information as to whether the steering (by the operator or the steering system) is correct or whether it causes damage to the plants by running over it.

A system, apparatus, and a method for detecting a possible deviation of an agricultural vehicle from a target path when processing plants grown in rows use an imaging sensor system whose field of view includes the ground engaging member of the vehicle and at the same time the rows of plants adjacent to the ground engaging member. This makes it possible for an operator or an automatic system to detect when the plants are being contacted (e.g., run over) and appropriate corrective measures can be initiated. In addition, the imaging sensor system can support an automatic steering system.

FIG. 1 shows a lateral view of a self-propelled agricultural vehicle 10 in the form of an agricultural tractor and a tool 12 in the form of a sprayer attached to a three-point linkage 14 of vehicle 10. Vehicle 10 may be built on a supporting frame 16 supported on steerable ground engaging members such as wheels or tracks. In one example, front wheels 18 and driven rear wheels 20 support a cabin 22 in which an operator's workstation 24 is located. The operator's workstation 24 includes a steering wheel 26, a seat 28, pedals (not shown) and an input and output unit 30. In the following directions, such as front and rear or sideways, refer to the forward direction of vehicle 10, which is to the left in FIG. 1.

The vehicle 10 comprises an system for the automatic guidance of the vehicle over a field comprising a visual sensor system 62 with a camera 32 designed as a mono or stereo camera (and/or a scanning, active sensor, e.g. a lidar system), image processing system 36 connected to the image sensor of the camera 32 in a signal-transmitting manner, a navigation unit 48 mounted on the roof of cabin 22, a steering signal calculation unit 46 and a steering control system 34.

The navigation unit 48 is designed to receive signals from a satellite-based navigation system (GNSS, such as GPS, Galileo, etc.). The navigation unit 48 can be equipped with an inertial navigation system to improve the accuracy of the position signals, especially in unfavorable reception conditions. In addition, it may be connected to a receiver for receiving correction signals from an appropriate system (DGPS, RTK) to improve the precision of the navigation system signals and/or to odometric sensors detecting the direction of steering and movement of the front wheels 18, i.e., a steering angle sensor 44 and a speed sensor for detecting the rotation of the front wheels. The odometrically acquired signals are usually fused with those of the inertial navigation system and the satellite-based, possibly corrected signals, e.g., by a Kalman filter. The navigation unit 48 emits a signal at regular intervals about its two- or three-dimensional position and, optionally, its speed and/or orientation.

The vision system 36, the navigation unit 48, the steering signal calculation unit 46 and the steering control system 34 are connected to each other via a bus system 50, which can operate, for example, according to the protocol according to ISO 11783 or a successor thereto.

The steering signal calculation unit 46 is spatially integrated in an input and output unit 30, which is provided with an operator interface in the form of a display unit 54 and an input device 56. The input and output unit 30 can perform the function of a virtual display according to ISO 11783.

The steering control system 34 is connected to a valve 38 for controlling a steering actuator 40 and to the steering angle sensor 44 for detecting the current steering angle of the front wheels 18.

Figure 2:
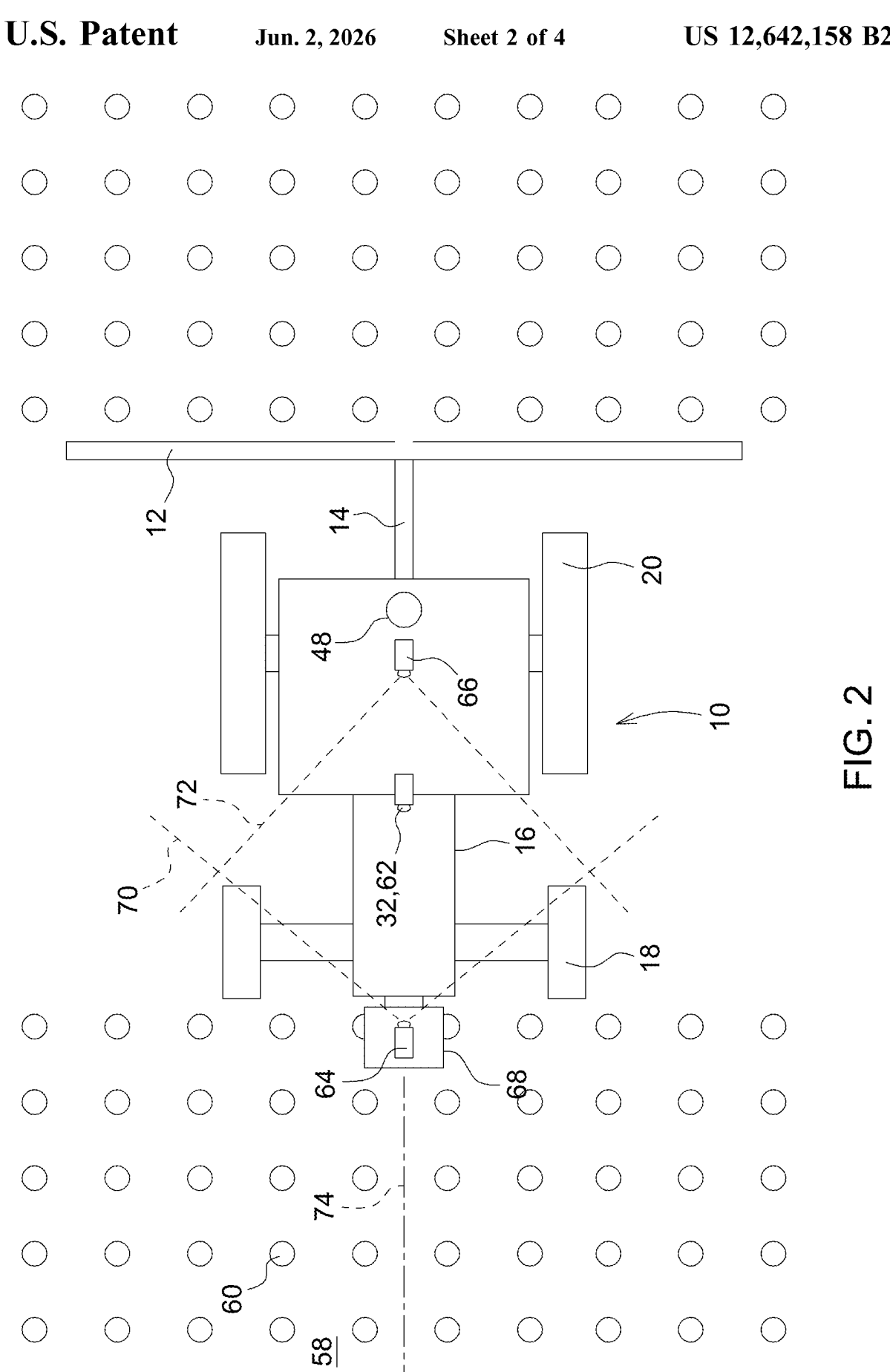
FIG. 2 shows a top view of the vehicle when working in the field.

FIG. 2 shows atop view of vehicle 10 at work in a field 58 with plants 60 grown in rows. The steering control system 34 is controlled by the steering signal calculation unit 46 based on the fused signals of the visual sensor system 62 (camera 32) and the navigation unit 48 in such a way that the front wheels 18 and the rear wheels 20 move between the rows of plants 60 without passing over the plants 60. The visual sensor system 62 can detect the plants 60 (see, for example, U.S. Pat. No. 6,445,983 B1; European Patent No. EP 1 266 553 A2; WIPO Patent No. WO 2008/150418 A1; WIPO Patent No. WO 2018/067473 A1; Wan et al.; German Patent No. DE 10 2023 119 302.3), and/or tramlines or lanes between plants 60, (German Patent No. DE 10 2016 209 437 A1). The tool 12 could also be any other tool 12, e.g., a hoe used to remove unwanted weeds between the rows of plants 60.

As already mentioned at the introduction, it is conceivable that the automatic steering system, which in the present case comprises the visual sensor system 32, the image processing system 36, the navigation unit 48, the steering signal calculation unit 46 and the steering control system 34, does not work correctly due to certain faults and the wheels 18, 20 of the vehicle 10, which could also be designed as a self-propelled sprayer, contacting (e.g., run over) plants 60 in field 58. To detect such problems, an imaging sensor system 78 with a camera 64 and/or 66 is provided. Camera 64 is located in front of the front axle of vehicle 10 on its underside (in FIG. 1 on a front weight 68) and looks from there backwards and downwards. Another camera 66 is arranged on the underside of the rear axle between the rear wheels 20 or at another suitable location at the underside of the rear area of the vehicle 10 and looks from there forwards and downwards. The camera 64 and/or 66 may be designed as a black-and-white camera, color camera, multispectral camera or infrared camera, in mono or stereo version or as a PMD camera. Instead of the camera 64, 66 or in addition to it, a scanning laser sensor (lidar) can also be used.

Figure 3:
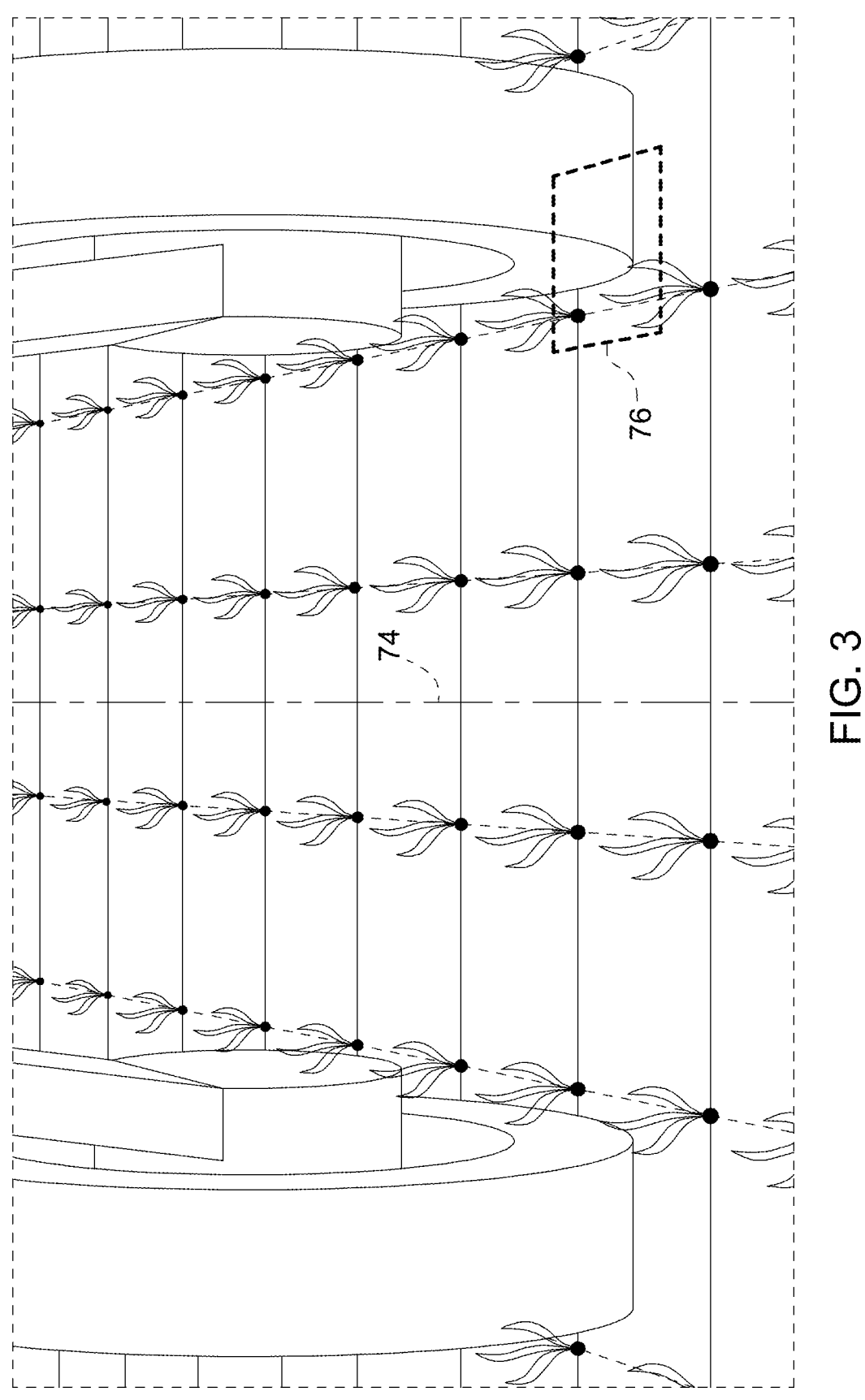
FIG. 3 shows an example of an image displayed to the operator of the vehicle on a display device.

FIG. 2 shows the lateral boundaries 70, 72 of the fields of view of cameras 64 and 66. Accordingly, the cameras 64, 66 capture the field below the vehicle 10, the plants present there 60 and the wheels 18, 20. Since the front and wheels 18, 20 usually run in the same lane, i.e. not laterally offset from each other, it would in principle be sufficient for the cameras 64, 66 to capture only the rear or front wheels 18, 20, although a detection of at least the contact points of all four wheels 18, 20 is preferred, as shown in FIG. 3. The angle of view of cameras 64, 66 should be sufficiently large for this (super wide angle or fisheye or separate cameras for the left and right sides). The image signal outputs of one or both cameras 64 and/or 66 are connected directly or via image processing systems 36 and the bus system 50 to the input and output unit 30. This makes it possible to display an image on the display unit 54, as shown in FIG. 3. The operator of vehicle 10 is thus able to detect whether the wheels 18, 20 pass over the plants 60 and, if necessary, to take appropriate measures. Accordingly, in the case of purely manual steering of vehicle 10 by the steering wheel 26, the operator may take appropriate countermeasures or, in the case of automatic steering by the automatic steering system, switch it off and take over the steering himself by the steering wheel 26. In the absence of an automatic steering system, but only the operator managing to steer the vehicle using the steering wheel 26, the display unit 54 may assist the operator to steer in such a way that no plant 60 is contacted/run over.

The vision system 36 or a processor/controller of the input and output unit 30 or the steering signal calculation unit 46 may be configured, after calling up a corresponding menu item of the input and output unit 30, to calculate one or more or all of the following data and together with the processed or unprocessed image signal of the camera 64, 66, between which the operator may also switch, the display unit 54 to indicate:

(a) a representation of the nominal path 74 which the steering signal calculation unit 46 is currently following to enable the operator to detect any errors of the steering signal calculation unit 46 when calculating the nominal path 74. The operator may also be given the option of moving the nominal travel 74 to the left or right, if necessary, or may be given a suggestion to perform manual steering using the steering wheel 26 (considering the image shown on the display unit 54). Also, based on a comparison between nominal path 74 and plants 60 in the image of cameras 64 and/or 66, it can be seen if the vehicle 10 drifts to one side and a corresponding message is given to the operator via the display unit 54. He can then take over the steering himself or make a corresponding correction input to the steering signal calculation unit 46.

(b) other information may also be displayed in or next to or above or below the image shown in FIG. 3, such as the current wind direction and wind strength measured by a weather station on vehicle 10 (see European Patent No. EP 1 321 037 A2) or which can be determined from external data transmitted to vehicle 10. This allows the operator to detect if the visual sensor system 62 does not correctly detect the position of the rows of plants due to the influence of the wind and, if necessary, to make a correction input to the steering signal calculation unit 46.

(c) in addition, information regarding the tires of the wheels 18, 20, such as their width, and information regarding possibly run over plants 60 can be displayed, be it that only an indication is given that plants 60 are being run over at all (e.g. by displaying a mark 76 in the displayed image, e.g. in the area of the affected tire and the plants there) or a quantitative indication of the proportion of the plants 60 (e.g. that a certain percentage of plants 60 of one or more rows have already been or are likely to be run over during the cultivation of field 58, or an extrapolation of how high the impact on yield will be). In particular, the information regarding the number of plants 10 ran over can be used to calculate a metric that indicates the percentage of damaged crops while the system is actively steering the vehicle 10. This metric is a good indicator of the job quality and can be used to detect loss of performance and inform the operator that system has issues, require a calibration or maintenance.

The image processing system 36 or the processor/controller of the input and output unit 30 or the steering signal calculation unit 46 is thus programmed to detect plants 60 run over in the image of the camera 64 and/or 66. This can be done in such a way that in the image of the camera 64 and/or 66 it is recognized, on the one hand, at which lateral position at least the plants 60 adjacent to the wheels 18, 20 are located in the image, and, on the other hand, it is recognized at which lateral position in the image the tires of the wheels 18, 20 are located. Plants 60 can in the simplest case be identified by their usually green color and/or by their shape and/or texture or the like, which is analogous valid for the usually black color and/or rectangular and/or studded shape of the tires, while a distinction from field 58 is possible based on its location, texture and/or color. Any lateral overlap of the tires and the plants 60 can thus be easily detected and used to generate an appropriate signal. The simultaneous detection of the wheels 18, 20 and their tires on the one hand and the rows of plants 60 on the other hand has the advantage that it is relatively easy to do and that an overlap can be easily detected, and that no image processing is required to detect damaged plants, as can be done in principle by a camera looking backwards or downwards from vehicle 10 (not shown, but see European Patent No. EP 2 545 761 A1, German Patent No. DE 10 2019 207 984 A1, European Patent No. EP 4 140 238 A1), which does not cover wheels 18, 20 and their tires, would be possible, but is more complicated and prone to errors.

In one possible embodiment, the signal of one or both of the cameras 64, 66 (regardless of or in addition to any detection of plants being run over) may complement or replace the signal of the camera 32 of the visual sensor system 62, because the cameras 64 and/or 66 also provide the steering signal calculation unit 46 with information about the lateral position and orientation of the rows of plants 60 with respect to vehicle 10. Accordingly, the steering signal calculation unit 46 receives information from the image processing systems 36 of cameras 32 and 64 and/or 66 regarding the lateral position and orientation of the rows of plants 60 in relation to the vehicle 10 and a relative accuracy. If necessary, i.e. if in certain situations the signal of the camera 64 and/or 66 should be more accurate than that of the camera 32, e.g. in weedy fields or unfavorable lighting situations (frontal backlight, e.g. due to low sun), the signal of camera 64 and/or 66 is used to generate the steering signal, especially in combination (after fusion) with a lateral position and orientation of the rows of plants 60 in relation to the vehicle 10 calculated on the basis of a stored path and the signal of the navigation unit 48. In this regard, reference should be made once again to German Patent Appl. No. DE 10 2023 119 302.3, which is incorporated by reference in its entirety.

If the camera 32 is designed as a stereo camera, the associated image processing system 36 can provide three-dimensional point cloud information of the environment (i.e., the area in front of the vehicle 10). A subset of the three-dimensional points belonging to a representative surface describing the slope of the terrain in front of vehicle 10 can be identified. An ideal scenario would be an open field where every captured point belongs to the ground. In conditions with plants, some points belong to plants 60 and some to the soil. Either points on the ground can be filtered out and used to fit to a plane, or all points are used so that the matched plane is an average plane raised relative to the ground. Be that as it may, this adjusted plane contains information about the slope of the terrain (forward and lateral) with respect to a reference plane of vehicle 10. It can therefore be seen if the terrain in front of the vehicle should be inclined with respect to the ground contact level of vehicle 10.

This inclination information from the stereo camera 32 (or an inclination taken from a map of the field) can be processed together with the signals of the camera 64 and/or 66, for the latter nothing changes when the vehicle 10 travels on an inclination, since it always detects the ground under the vehicle 10 and the ground is therefore always horizontal for it. Thus, if the inclination of field 58 should change, the images from camera 32 (or data for a stored path) can be merged with the signals from camera 64 and/or 66 using the slope of the terrain in front of vehicle 10 to avoid steering errors, especially in the transition area. In other words, the vision system 36 of camera 64 and/or 66 knows the three-dimensional shape of the field 58 in front of vehicle 10 and can thus avoid any errors in the signals of camera 64 and/or 66 that could occur if the slope of the terrain and thus also of vehicle 10 changes.

Furthermore, the state-of-the-art steering of vehicle 10 based on the visual steering system 62 is based on the fact that the target distance 74 to be traveled is extrapolated to a reference point of vehicle 10, which may be the rear axle of vehicle 10 (compare favorably U.S. Pat. No. 6,445,983 B1). This is problematic if (e.g., after vehicle 10 has been parked) a first image is captured again, which is then extrapolated to a position below the rear axle of vehicle 10 based on a stored data set and is later corrected based on the images subsequently acquired. The camera 64 and/or 66 may be used (independently of or in addition to any detection of plants that may have been run over) to replace or modify the stored data set in order to trace the path generated by the visual steering system 62 to the reference point, in particular the rear axle, of vehicle 10 with the rows of plants 60 recorded below vehicle 10 and thus make it more accurate. This makes it possible to improve steering based on rows of plants when vehicle 10 is stopped for a period of time, when driving on a curved row of plants, and when operating is resumed at a later time. In other words, the part of the nominal paths 74 which is immediately in front of vehicle 10, i.e., at the rear of the field of view of the visual steering system 62, and below the vehicle 10, is created based on the signals of the camera 64 and/or 66 when an automatic steering operation based on the visual steering system 62 is (re) started.

Figure 4:
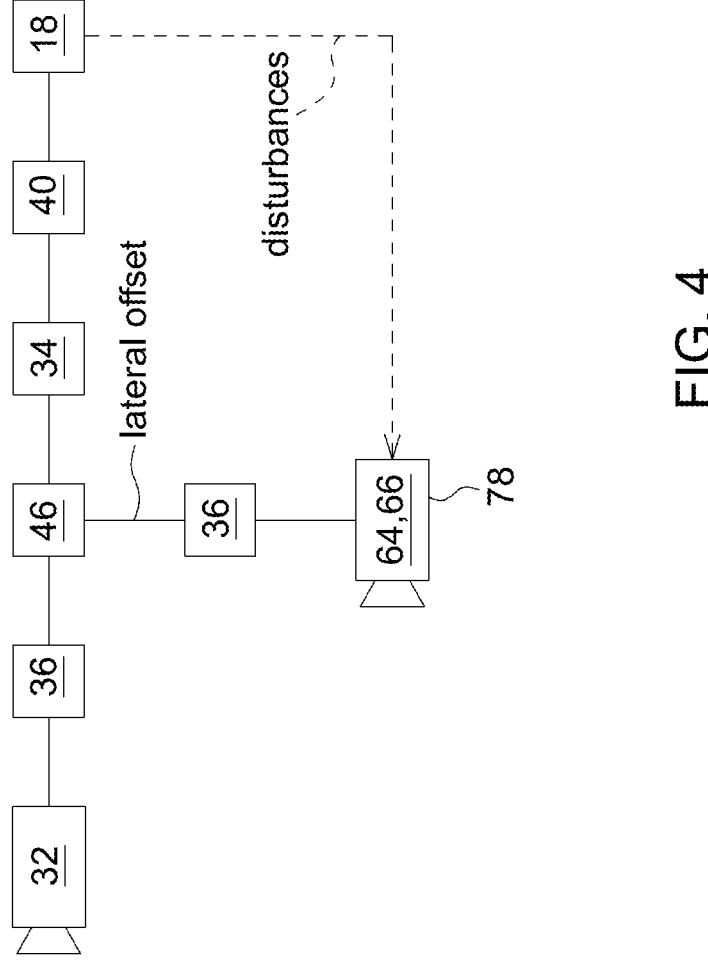
FIG. 4 is a block diagram depicting the signals from the camera observing the plants and wheels for the correction of possible errors in the steering signal based on external disturbances.

In addition, it is possible that, in the event of a detection of plants 60 being run over in the manner described above, the steering signal calculation unit 46 may shift the respective target path 74, on which the steering signal to the steering control 34 is based, in a lateral direction to avoid driving over plants 60. Accordingly, the signal from camera 64 and/or 66 serves as a feedback signal to the steering signal calculation unit 46, as shown schematically in FIG. 4. Disturbances which may be caused, for example, by a lateral slope which cause vehicle 10 to deviate to the left or right and which are not detected, at least in the case of steering based solely on the visual sensor system 62, shall be corrected in this way. Other possible disturbances may be slippage of the wheels 18, 20, or faults of the visual sensor system 62 or in the stored target path on which a steering action based on navigation unit 48 is based. As can be seen in FIGS. 1-3, the region observed by camera 64 (i.e., the rear wheels 20) and the position of the navigation unit 48 are in the forward direction of vehicle 10 relatively close to each other, and to the control point of vehicle 10 (used for generating the steering signal, see U.S. Pat. No. 6,455,983 B1), which is at the center of the rear axle. In this way, any errors between optically detected features and the vehicle position and orientation detected by navigation unit 48 due to offsets in forward direction are reduced or avoided.

Those skilled in the art will recognize that it is common within the art to implement apparatuses and/or devices and/or processes and/or systems in the fashion(s) set forth herein, and thereafter use engineering and/or business practices to integrate such implemented apparatuses and/or devices and/or processes and/or systems into more comprehensive apparatuses and/or devices and/or processes and/or systems. That is, at least a portion of the apparatuses and/or devices and/or processes and/or systems described herein can be integrated into comprehensive apparatuses and/or devices and/or processes and/or systems via a reasonable amount of experimentation.

Although the present disclosure has been described in terms of specific examples and applications, persons skilled in the art can, considering this teaching, generate additional examples without exceeding the scope or departing from the spirit of the present disclosure described herein. Accordingly, it is to be understood that the drawings and description in this disclosure are proffered to facilitate comprehension of the present disclosure and should not be construed to limit the scope thereof.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

It should also be noted that the different examples described herein can be combined in different ways. That is, parts of one or more examples can be combined with parts of one or more other examples. All of this is contemplated herein.

The invention claimed is:

1. A system for detecting a path of an agricultural vehicle in a field comprising:
  a ground engaging member supporting the agricultural vehicle; and
  an image sensor system associated with the agricultural vehicle, the image sensor system configured with a field of view including the ground engaging member and a plant row in the field adjacent to the ground engaging member and detecting a deviation from a target path of the agricultural vehicle wherein the ground engaging members contact the plant row, wherein the imaging sensor system is connected to a display unit on which an image of the ground engaging member and a plant row adjacent the ground engaging member is displayed using an output signal of the imaging sensor system.

2. The system of claim 1 wherein the imaging sensor system is connected to a processor configured to detect, using the output signal of the imaging sensor system, a plant row contacted by the ground engaging member.

3. The system of claim 2 wherein the processor is configured to detect a lateral position of the ground engaging member and the lateral position of the plant row image signal of the imaging sensor system and, in the event of an overlap of the lateral positions, detect contact of the plant row by the ground engaging member.

4. The system of claim 3 wherein the processor is programmed to recognize the ground engaging member by at least one of color, shape, and texture.

5. The system of claim 3 wherein the processor is programmed to recognize the plant row by at least one of color, shape, or texture.

6. The system of claim 3 wherein the imaging sensor system is connected to a steering signal calculation unit configured to generate a steering signal for the vehicle based on the signals of at least one of a forward-facing visual sensor system and a navigation unit, the steering signal calculation unit further configured to use the signal from the imaging sensor system to adjust the steering signal.

7. The system of claim 6 wherein the steering signal calculation unit is configured, upon detection of contact with the plant row based on the output signal of the imaging sensor system, to move the target path laterally to avoid contact with the plant row.

8. The system of claim 7 wherein the steering signal calculation unit is configured, upon detection of contact with the plant row based on the output signal of the imaging sensor system, to generate a second target path using the signal from the imaging sensor system.

9. The system of claim 8 wherein the steering signal calculation unit is configured, upon detection of contact with the plant row based on the output signal of the imaging sensor system, to extend a target travel generated by a visual sensor system to a reference point on the vehicle.

10. The system of claim 9 wherein the reference point is the rear axle of the vehicle.

11. The system of claim 1 wherein the imaging sensor system includes a camera mounted on a front counterweight and oriented in at least one of a backward and forward direction in relation to a direction of travel of the vehicle.

12. A method for detecting a path of an agricultural vehicle in a field comprising:

providing an image sensor system associated with the agricultural vehicle;

viewing, simultaneously, a ground engaging member of the agricultural vehicle and a plant row in the field adjacent to the ground engaging member; and detecting, using the image sensor system, contact with a plant in the plant row by the ground engaging member indicating a deviation of the agricultural vehicle from a target path when performing an operation in the field, further comprising the step of displaying on a display unit an image of the ground engaging member and a plant row adjacent the ground engaging member using an output signal of the imaging sensor system.

13. The method of claim 12 further comprising the step of determining, using the output signal of the imaging sensor system, contact of the plant by the ground engaging member.

14. The method of claim 13 further comprising the step of detecting a lateral position of the ground engaging member and the lateral position of the plant in the plant row in the image signal of the imaging sensor system and, in the event of an overlap of the lateral positions of the ground engagement member and the plant, determining contact of the plant by the ground engaging member.

15. The method of claim 14 further comprising the steps of providing a steering signal calculation unit configured to generate a steering signal for the vehicle based on the signals of at least one of a forward-facing visual sensor system and a navigation unit and adjusting the steering signal using the output signal from the imaging sensor system.

16. The method of claim 15 further comprising the step of, upon detection of contact with the plant in the plant row based on the output signal of the imaging sensor system, moving the target path laterally to avoid contact with the plant.

* * * * *